INVENTOR
HARALD FEUERHERM

United States Patent Office 3,611,494
Patented Oct. 12, 1971

3,611,494
EXTRUSION HEAD FOR EXTRUDING ANNULAR ARTICLES OF THERMOPLASTIC MATERIAL
Harald Feuerherm, Kohlkaul, Siegkreis, Germany, assignor to Kautex-Werk Reinold Hagen, Hangelar uber Sieburg, Rhineland, Germany
Filed Mar. 18, 1969, Ser. No. 808,159
Claims priority, application Germany, Mar. 18, 1968, P 17 04 791.5
Int. Cl. B29d 23/04
U.S. Cl. 18—14 R
8 Claims

ABSTRACT OF THE DISCLOSURE

In an extrusion head an annular piston, during its extrusion stroke, penetrates into a storage chamber discharging therefrom thermoplastic material through an extrusion die. To refill the storage chamber in preparation for the successive extrusion stroke, thermoplastic material is introduced thereinto through a passage, the width of which is defined by a fixed part in the extrusion head and by a side wall of the annular piston. The material filling the chamber displaces the piston towards its retracted position in such a manner that the newly arriving particles settle immediately adjacent the leading face of the piston and remain substantially stationary within and with respect to the storage chamber. As a result, the material particles are discharged from the storage chamber in the order of their arrival thereinto.

---

Figure 1:
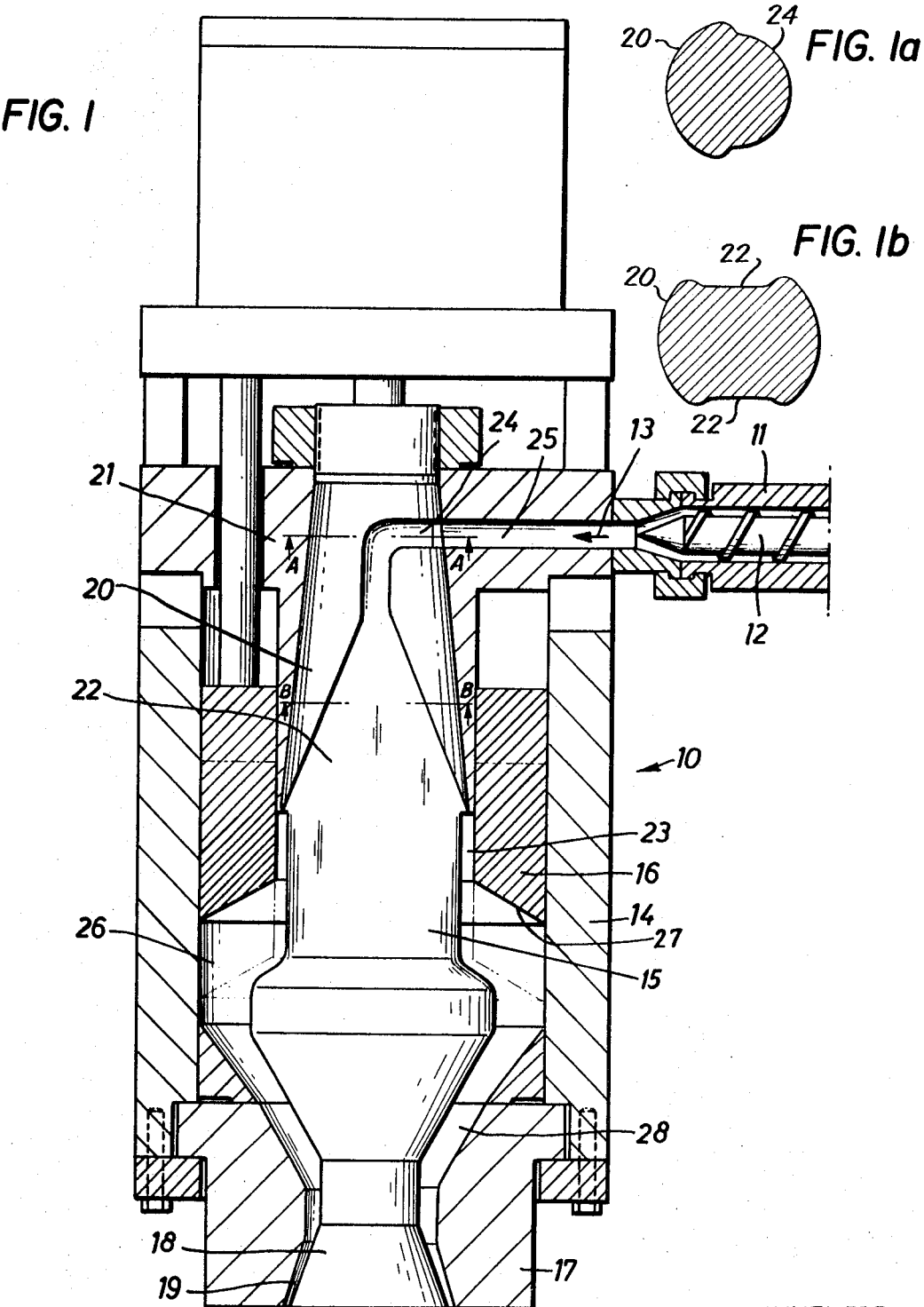

The invention relates to an extrusion head for extruding annular articles, e.g. hoses or hose sections, of thermoplastic material.

One type of such head, which is connected to an extruder, comprises a housing, a core, an inlet, an annular extrusion die for the discharge of the thermoplastic material, a storage chamber adapted to be emptied by an annular piston, and an annular or cylindrical passage joining said storage chamber upstream thereof.

Equipment of this type is known where, between the upstream passage formed as an annular space and the storage chamber arranged coaxially therewith, there is disposed a sleeve guiding the annular piston by slidably engaging the inner face thereof. At the lower end of this sleeve the material flows from the annular passage into the storage chamber, forcing at the same time the annular piston towards its retracted position, while filling the storage chamber. It will be appreciated that those parts of the material which get into the storage chamber first remain longest in the extrusion head, while those parts of the material which get into the storage chamber immediately before the end of the filling step, and therefore immediately before the start of the emptying step of the storage chamber, remain only for a very short time inside the extrusion head. As a result, in a device of the aforedescribed known structure, it is unavoidable that for different individual particles the period from the moment of entering the extrusion head to the moment of leaving the same through the annular extrusion die varies widely. This applies in particular to those material particles and layers which are in the close vicinity of the front or leading face of the annular piston acting on the material in the storage chamber. These material particles are generally not forced out of the extrusion head through the die when the storage chamber is emptied, but remain in the space between the storage chamber and the extrusion die until the next emptying phase, which means that these material particles have a dwell-time inside the extrusion head which is many times the dwell-time of those material particles which get into the storage chamber immediately before the start of the discharge step. These differing dwell-times—which are not readily controllable—are extremely detrimental to the quality of the end product, regardless of whether the hose section or other article, possibly made therefrom, for example by blow molding, represents the final product.

It is an object of the invention to provide an improved extrusion head for extruding articles of thermoplastic material wherein the differences between the aforenoted dwell-times are minimized to such an extent that they have no effect on the quality of the end product.

Briefly stated, according to the invention, there is provided an extrusion head of the aforedescribed type, including an annular piston having a leading face and slidable between a fully retracted and a fully advanced position, at least one side wall of the piston and a stationary part of the extrusion head define a passage, the upstream terminus of which communicates with a material feeding means and the downstream terminus of which adjoins said leading face and communicates with a storage chamber in said head.

In order to refill the extrusion head following an extrusion step (the piston is then in its most advanced position), thermoplastic material is fed through said passage into the storage chamber. As the material particles emerge from the downstream terminus of said passage, they settle in the storage chamber immediately below said leading face forcing said piston upstream towards and eventually into its fully retracted position. The upstream displacement of the piston is effected by newly arriving particles which remain substantially stationary with respect to the storage chamber that expands as the piston is forced upstream. Thus, during the successive extrusion step, the material particles are discharged from the storage chamber by the downstream moving piston substantially in the sequence of their arrival into the storage chamber.

The invention will be better understood, as well as further objects and advantages will become more apparent, from the ensuing detailed specification of four exemplary embodiments taken in conjunction with the drawing, wherein:

FIGS. 1–4 are longitudinal sectional views of four embodiments of the extrusion head according to the invention and FIGS. 1a and 1b are sectional views taken along lines A—A and B—B, respectively, of FIG. 1.

In the construction of FIG. 1, an extrusion head generally indicated at 10 is connected with a screw extruder 11, in which thermoplastic material is plasticized under the influence of heat by a screw 12 and moved forward in the direction of the arrow 13 into the extrusion head. The latter consists essentially of a housing 14, a core 15 extending in longitudinal direction, an annular piston 16 which is axially slidable inside a storage chamber 26, and a die 17 which together with the lower end 18 of the core 15 defines the extrusion nozzle 19.

In FIG. 1, the annular piston 16 is shown in solid lines in an intermediate position, and in broken lines to indicate its most advanced position. On its outside, the extrusion head is provided with heating jackets (not shown for the sake of clarity) so as to maintain the thermoplastic material at the required temperature.

The core 15 is held in its upper, conical region 20 by a sleeve 21. In the conical region 20, the core 15 is provided with a circumferential groove 24 which extends approximately 180° about the core 15, as indicated in FIG. 1a. On diametrically opposed sides of core 15, the groove 24 is joined at right angles by groove portions extending parallel to one another and to the core axis. The groove portions widen into flaring recesses 22 having a curved cross section as indicated in FIG. 1b. The recesses 22 are disposed as mirror images with respect to the sectional plane of FIG. 1. At their lower end the recesses 22 extend over a circular arc of 180°, and communicate with an annular passage 23 which is defined by the central region of the core 15 and the annular end wall surface and the inner lateral annular wall surface of the annular piston 16, when the latter assumes any position below its fully retracted position.

The two recesses 22 communicate, by way of the circumferential groove 24, with an inlet duct 25 in the sleeve 21 and thus with the outlet opening of the screw extruder 11.

The thermoplastic material flowing from the screw extruder first forms a single stream of material which, on entering into the two circumferential groove 24, is divided into two partial streams. In the groove 24, the two partial streams are passed in different directions around the core 15 in an arc of approximately 90° to the upper terminus of the recesses 22. Thereafter, the partial streams are diverted downwardly into the recesses 22 where, with increasing width of these recesses, they are distributed over the perimeter of the core 15 until finally at the lower terminus of these two recesses 22 they merge and pass into the downstream-arranged annular passage 23. At the transition between the two recesses 22 and the annular passage 23 the two partial streams combine to a tubular form which subsequently enters the storage chamber 26.

Starting from the lower extreme position of the piston 16, which it assumes upon completion of a discharge step, the material flowing through the annular passage 23 will settle below the lower front face 27 and force the piston upwards. It is not necessary here to take special precautions to prevent any discharge of material through the extrusion die 19. It may be assumed in fact that the flow resistance which the material has to overcome on passing through the extrusion die 19 is considerably greater than the resistance offered by the piston 16 against its displacement upwards. In other words, no material will emerge from the die 19 until the piston 16 has reached its upper extreme position.

During the upward displacement of the piston 16, the material flowing through the annular passage 23 repeatedly settles underneath the lower front face of the piston 27. This arrangement ensures that the material particles which, during the filling step first entered into the lower region of the storage chamber 26, will remain there in the course of the entire filling step, and thus will be the first to be extruded through the nozzle 19 in the subsequent discharge step. In this way the dwell-time is necessarily equalized. Naturally, it is unavoidable that the material, which at the end of the discharge step is in the region 28 between the storage chamber 26 or annular passage 23 and the extrusion die 19, will remain there until the next discharge step. This is the material which was last in entering the storage chamber 26 and which will then be first to be forced out in the following discharge step.

The movement of the annular piston 16 in the direction of extrusion and the triggering of the movement are performed by known means such as a hydraulic drive. The reverse movement into the upper extreme position, as already mentioned, is effected by the inflowing material, and is therefore independent of the aforenoted hydraulic drive for the annular piston 16. In this way in every case an absolute coordination between the reverse movement of the piston 16 and the filling step inside the storage chamber 26 is ensured.

Figure 2:
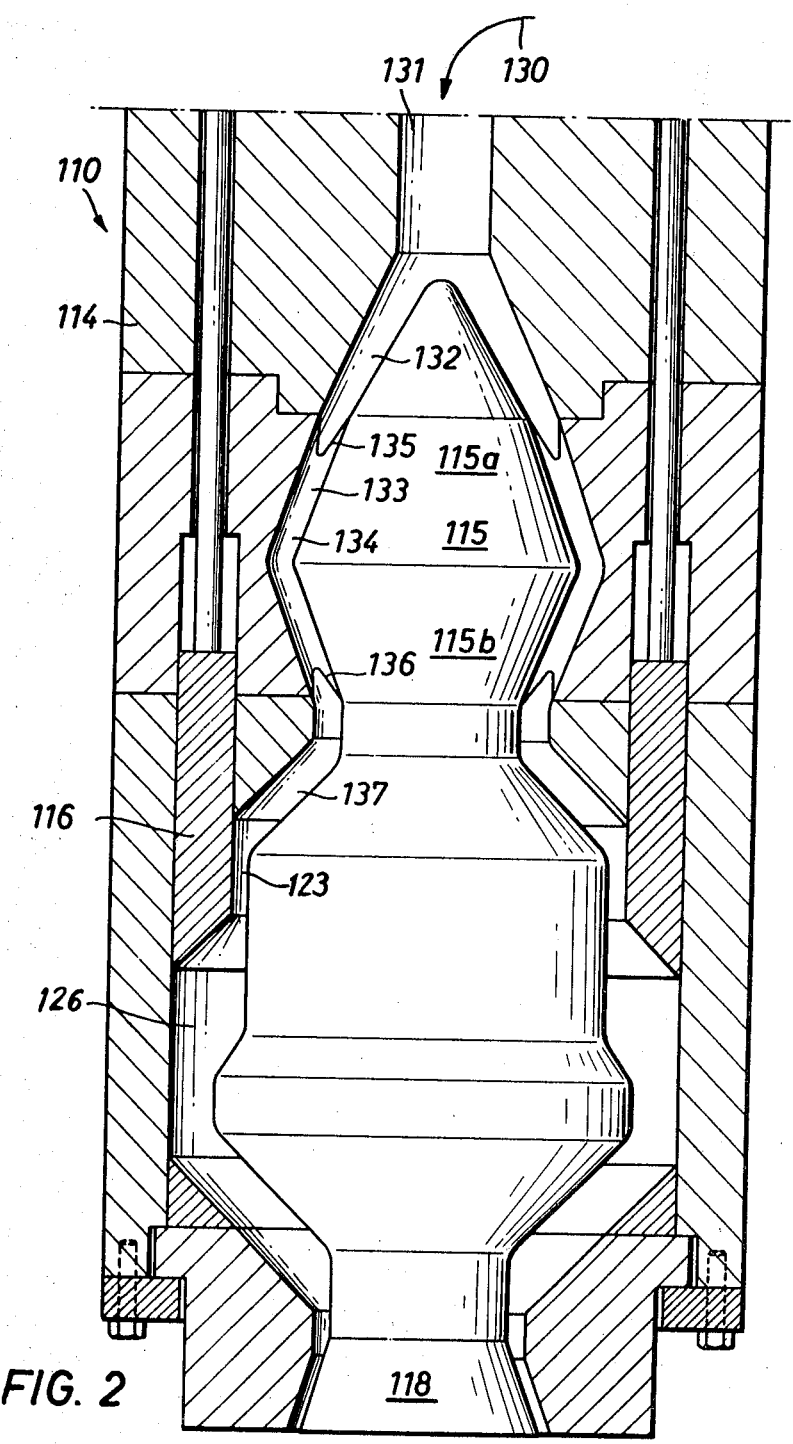

In the extrusion head shown in FIG. 2, where all the parts that correspond to those of the embodiment of FIG. 1 are given reference numbers increased by 100, the plastic material is fed axially into the extrusion head and also, the core 115 of the extrusion head is attached in a different manner. The material fed from the screw extruder (not shown) after it has changed direction in accordance with the arrow 130, enters into a vertical duct 131 which has a generally circular cross-section. In the direction of the extrusion die situated at the lower end of the extrusion head 110, the duct 131 joins an annular duct 132 which is defined by the housing 114 and the core 115, which in its upper region has the form of a double cone. The upper part 115a converges against the direction of flow of the material, while the lower part 115b coverges towards the extrusion die, that is, in the direction of flow of the material, and this part is joined to the nozzle core 118.

The holding of the core 115 is effected by means of webs 133 which connect the core 115 with the housing 114. The annular duct 132 in the upper core region communicates with a number of individual ducts 134, each delimited by two adjacent webs 133, the core 115 and the housing 114. The ducts 134 extend between the upper ends 135 of the webs 133 and the lower ends 136 thereof, where they connect with an annular chamber 137 which joins the storage chamber 126 (when the piston 116 is entirely retracted) or the annular passage 123 (when the piston 116 is lowered).

Preferably, these ducts 134 have over the whole length a constant width in a circumferential direction at uniform thickness defined by the distance between core 115 and housing 114, so that all of the ducts 134 will have in circumferential direction the same width as the annular duct 132 immediately above the webs 133. In this way it is ensured that the material is not subjected to any changes in pressure and to only insignificant changes in velocity.

The annular piston 116 is shown in FIG. 2 in an intermediate position.

Figure 3:
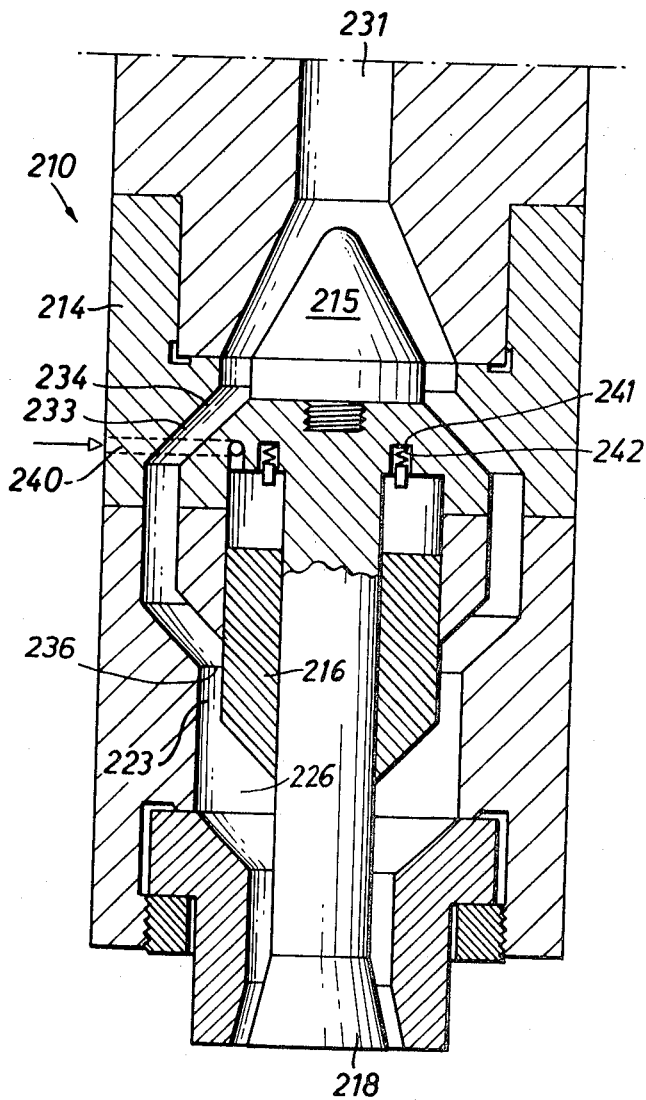

In the embodiment of FIG. 3 the parts corresponding to those shown in FIG. 2 are given reference numbers increased by 100. Here, too, the core 215 is connected, in the manner already described, with the housing 214 of the extrusion head 210 by means of webs 233. The material fed through a central duct 231 is distributed as in FIG. 2 by siutable design and dimensioning of the individual ducts 234.

As opposed to the first two embodiments, the annular passage 223 is delimited at the outside by housing 214 and at the inside by the piston 216. The latter is shown in its intermediate position in FIG. 3.

Further, in this embodiment the core 215 is designed in such a manner that the piston 216 may be retracted thereinto. By virtue of this structure, the diameter of the storage chamber 226 disposed between the piston 216 and the extrusion die is smaller than the largest diameter of core 215. This arrangement is particularly advantageous in that the outer diameter of the entire extrusion head may be maintained at a reduced value and thus the overall space requirement of a cluster of juxtaposed heads, often used for mass production, may be reduced.

The supply of a hydraulic fluid can take place through pipes 240 which pass through the web 233. The extrusion stroke of the annular piston 216 from its upper extreme position into its lower extreme position can be triggered by a limit switch 241 on which the piston acts in its upper extreme position through a spring 242. In this way the piston may be controlled, in connection with the discharge step, as a function of the pressure prevailing in the extrusion head. This type of arrangement can, of course, also be used in any of the other embodiments.

Figure 4:
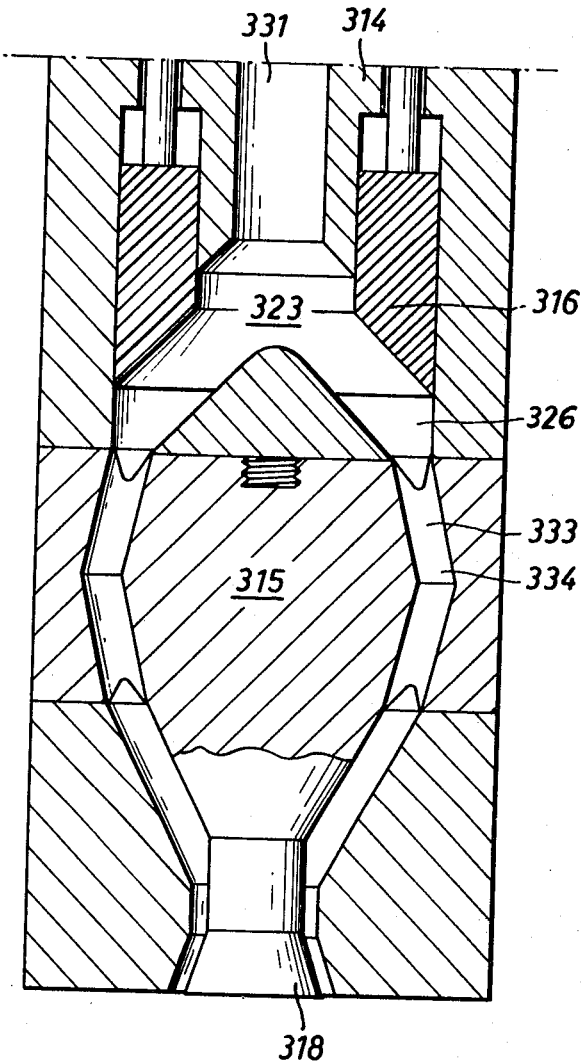

In the embodiment of FIG. 4 where the parts corresponding to those shown in FIG. 3 are given reference numbers increased by 100, the storage chamber 326 is arranged in the housing 314 upstream of the webs 333 and the individual ducts 334 situated between them.

The annular piston 316 is shown in its intermediate position.

While in the embodiments according to FIGS. 1–3, the passage 23, 123, 223 surrounds the respective core 15, 115, 215, and is annular in cross-section, the passage 323 in the embodiment of FIG. 4 is arranged substantially upstream of core 315 and, at least in its upper region, has a full, preferably circular, cross-section.

That which is claimed is:

1. In an extrusion head for extruding articles of thermoplastic material, said head being of a known type having
    (A) a housing,
    (B) an inlet extending into said housing,
    (C) an outlet formed as an extrusion die,
    (D) a storage chamber communicating with said inlet and with said extrusion die and disposed in said housing between said inlet and said die,
    (E) an annular piston having a leading face, inner and outer side walls, said annular piston adapted to execute an extrusion stroke during which it penetrates into said storage chamber and discharges said material therefrom through said extrusion die, said annular piston adapted to execute a return stroke during which said storage chamber is filled with thermoplastic material through said inlet, and
    (F) power means causing said piston to execute said extrusion stroke,
    the improvement comprising a passage delimited laterally at least by one of said side walls of said piston, said passage communicating with said storage chamber in the immediate vicinity of said leading face of said piston and with said inlet.

2. An improvement as defined in claim 1, including triggering means to actuate said power means when said piston is in an extreme position at the end of said return stroke.

3. An improvement as defined in claim 2, wherein said triggering means is a limit switch operable by said piston upon its arrival in said extreme position.

4. An improvement as defined in claim 1, wherein said passage is of circular cross-section and is laterally delimited by the inner side wall of said piston.

5. An improvement as defined in claim 4, including a core centrally and longitudinally positioned in said housing and firmly affixed thereto by means of webs, said passage and said storage chamber are disposed upstream of said webs.

6. An improvement as defined in claim 1, including a core centrally and longitudinally positioned in said housing and firmly affixed thereto, said passage is of annular cross-section and is delimited laterally by the inner side wall of said annular piston and the outer face of said core.

7. An improvement as defined in claim 6, wherein said core is firmly affixed to said housing by means of webs, said passage and said storage chamber are disposed downstream of said webs.

8. An improvement as defined in claim 1, wherein said passage is of annular cross-section and is laterally delimited by the outer side wall of said annular piston and by an inner wall of said housing.

References Cited

UNITED STATES PATENTS 3,345,690   10/1967   Hagen _____ 18—14

J. SPENCER OVERHOLSER, Primary Examiner

D. S. SAFRAN, Assistant Examiner